United States Patent
Sugahara et al.

(10) Patent No.: US 8,725,154 B2
(45) Date of Patent: May 13, 2014

(54) HANDOVER PROPERTIES ESTIMATION SYSTEM, METHODS THEREOF, AND STORAGE MEDIUM

(75) Inventors: Hiroto Sugahara, Tokyo (JP); Kosei Kobayashi, Tokyo (JP)

(73) Assignee: NEC Corporation, Tokyo (JP)

(*) Notice: Subject to any disclaimer, the term of this patent is extended or adjusted under 35 U.S.C. 154(b) by 44 days.

(21) Appl. No.: 13/337,780

(22) Filed: Dec. 27, 2011

(65) Prior Publication Data

US 2012/0165024 A1 Jun. 28, 2012

(30) Foreign Application Priority Data

Dec. 28, 2010 (JP) .................................. 2010-292133

(51) Int. Cl.
*H04W 36/00* (2009.01)

(52) U.S. Cl.
USPC ........... 455/440; 455/436; 455/437; 455/438; 455/439; 455/441; 455/442; 455/443

(58) Field of Classification Search
USPC ......... 455/436, 437, 438, 439, 440, 441, 442, 455/443
See application file for complete search history.

(56) References Cited

U.S. PATENT DOCUMENTS

2007/0129072 A1* 6/2007 Yamato et al. ............. 455/422.1
2011/0244859 A1* 10/2011 Tsuda .......................... 455/436

FOREIGN PATENT DOCUMENTS

JP 2008-258855 A 10/2008
WO 2006135004 A1 12/2006

OTHER PUBLICATIONS

T. Jansen et al., "Handover parameter optimization in LTE self-organizing networks", Proceedings of the 72nd Vehicular Technology Conference Fall (VTC 2010-Fall), Sep. 9, 2010, 6 pages total English.
International Search Report dated Feb. 7, 2012, issued in counterpart International Application No. PCT/JP2011/007254.
"Method for point-to-area predictions for terrestrial services in the frequency range 30 MHz to 3000 MHz," ITU-R Recommendation, p. 1546-3 (57 pp).
K. Kobayashi et al., "3-Dimensional SON Simulator based on Realistic Radio Propagation and User Mobility", 2010 IEICE (The Institute of Electronics, Information and Communication Engineers) Communications Society, B-5-91, Sep. 2010, (1 pp).
Masaharu Hata, "Empirical Formula for Propagation Loss in Land Mobile Radio Services", IEEE Transactions on Vehicular Technology, Aug. 1980, vol. 29, No. 3, p. 317-325.
Yoshio Hosoya (editorial supervision), "Radiowave Propagation Handbook", Realize Science and Engineering Center Co., Ltd., 1999, p. 209-210, p. 234-243.

* cited by examiner

*Primary Examiner* — Khalid Shaheed
(74) *Attorney, Agent, or Firm* — Sughrue Mion, PLLC

(57) ABSTRACT

A handover properties estimation system includes a moving-route extraction unit which extracts moving routes which pass through a handover area or a neighboring area by using map information of the handover area and the neighboring area. The handover area is an area in which a handover process occurs between cells in a mobile communication system. The system further includes a moving-route handover properties calculation unit for calculating handover properties of the moving routes extracted by the moving-route extraction unit, by using radio-wave environment information of the moving routes.

12 Claims, 10 Drawing Sheets

HANDOVER PROPERTIES ESTIMATION SYSTEM, METHODS THEREOF, AND STORAGE MEDIUM

This application claims priority from Japanese patent application No. 2010-292133, filed on Dec. 28, 2010, the disclosure of which is incorporated herein in its entirety by reference.

FIELD

Apparatuses and methods consistent with exemplary embodiments relate to a handover properties estimation system for estimating a handover properties of a mobile communication system by use of radio-wave environment information in an area, a handover properties estimation method, and a medium in which a handover properties estimation program is stored. Further, apparatuses and methods consistent with exemplary embodiments relate to a handover parameter optimization system for optimizing a parameter relevant to an improvement in quality of handover, a handover parameter optimization method, and a medium in which a handover parameter optimization program is stored.

In a mobile communication system having a mobile terminal such as a mobile phone device, in order to secure a communication status stably even when a user moves during a communication, a process of changing a cell to which the user belongs as needed is performed. Such a process is called a handover.

The handover process in a mobile communication system is briefly described with reference to FIG. 12. Herein, LTE (Long Term Evolution) is assumed as an example of the mobile communication system.

FIG. 12 shows a received-signal quality over time of a reference signal measured in a mobile terminal. Qs is a received-signal quality of a source cell to which the mobile terminal is connected before a handover. Qt is a received-signal quality of a target cell to which the mobile terminal is connected after the handover. A time when Qt is larger than Qs by a prescribed offset (Off) is an opportunity for the handover. That is, a trigger of the handover occurs. This time is referred to as a handover trigger time (Tt). Further, when such a state where Qt is larger than Qs by the offset (Off) continues for a given trigger time (TTT:Time To Trigger), the handover process starts. This time is referred to as a handover start time (Ts). The handover process includes processes such as information notification and command instruction between the mobile terminal and the source cell or between the mobile terminal and the target cell, and setting between the source cell and the target cell. A time required for these processes is referred to as a handover process time (HOT). When the handover process time (HOT) elapses from the handover start time (Ts), the handover process is finished. This time is referred to as a handover end time (Te).

Note that, for the LTE system, for example, RSRQ (Reference Signal Received Quality) and RSRP (Reference Signal Received Power) can be used as the received-signal quality of a reference signal used for the handover process.

In an actual service area, Qs and Qt may suddenly decrease due to an influence of shadowing or the like. Due to the sudden decrease in Qs and Qt, the handover process may fail. Concrete examples of handover failure are described below.

The first example is that Qs suddenly decreases during the handover process, and unusual disconnection occurs. This example is called Too Late Handover, which means that the execution of the handover process is too late. In the actual system, Too Late Handover is detected by reconnection to a target cell after the unusual disconnection.

The second example is that Qt suddenly decreases during or just after the handover process, and unusual disconnection occurs. This example is called Too Early Handover, which means that the execution of the handover process is too early. In the actual system, Too Early Handover is detected by reconnection to a source cell after the unusual disconnection.

The third example is that Qs or Qt suddenly decreases during or just after the handover process, unusual disconnection occurs, and subsequently the mobile terminal is reconnected to a third cell, which is different from the source cell and the target cell. This example is called Handover to Wrong Cell, which means that the mobile terminal should have been handed over directly to the third cell from the source cell, instead of the target cell.

In any of the above examples, unusual disconnection occurs in the middle of or just after the handover process. Further, there are such examples in which even if any unusual disconnection does not occur, the unusual disconnection should be recognized as highly likely to occur, as follows. One example is when handovers occur frequently in short time between two specific cells A and B. This example is called Ping Pong Handover. The second example is that right after a handover occurs from a cell A to a cell B, a handover to a cell C, which is different from the cell A, occurs. This example is called Rapid Handover.

In order to minimize the above problems of the handover, it is preferable that a parameter associated with a handover be optimized. For example, in order to hasten a start point of a handover to a cell in which Too Late Handover occurs frequently, it is preferable that the offset (Off) be lowered or that the process be performed with Qt set slightly larger than an actual value. Note that an offset value peculiar to a cell for use in the technique to increase the value of Qt is referred to as Cell Individual Offset (CIO).

Generally, the process of the optimization of handover parameters is performed after the operation of a system actually starts and takes into consideration a status of handover failure that occurs in a mobile terminal. However, the best quality possible should be secured before the operation starts. Further, the handover parameter optimization should take into account not only measurement data provided from a mobile terminal, but also the radio-wave environment of a whole service area including locations in which measurements are not performed by the mobile terminal.

In order to perform such a handover parameter optimization in a design stage or a handover parameter optimization based on a radio-wave environment of the whole service area determined after operation starts, handover properties that occur in an actual service area should be estimated, based on radio-wave environment information for the whole service area rather than some spots in the service area.

An example of a technique to optimize a handover parameter by use of radio-wave environment information of a service area is a method described in Patent Literature (PTL) 1. The method described in PTL 1 calculates radio-wave environment information of a service area by estimation of a radio-wave propagation, and a start point and an end point of a handover area found based on an assumed moving speed of a mobile terminal by use of the radio-wave environment information thus calculated. By use of radio wave qualities of a source cell and a target cell at the start point and end point thus obtained, the success or failure of the handover is estimated. For example, when the reception quality of the source cell at the end point is less than a predetermined quality determination value Q1, or, when the reception quality of the target cell at the end point is less than a predetermined quality determination value Q2, it is estimated that a handover would fail.

Another technique to optimize a handover parameter by use of radio-wave environment information of a service area is, for example, a method described in Non-Patent Literature (NPL) 1. The method described in NPL 1 is such that a plurality of mobile terminals to which radio-wave environment information of a service area is provided are placed in a virtual space. While these mobile terminals are moved at a predetermined speed, operations of a base station and the mobile terminals are simulated, and the success or failure of communications including handovers is determined. The predetermined speed is determined depending on a mobile object such as a walker or a car that carries a mobile terminal. Such a method is called a dynamic simulation. The dynamic simulation is widely used as a technique to estimate a communication quality with high accuracy.

With the use of FIG. 13, a process of the dynamic simulation is described. Initially, a plurality of mobile terminals are placed in an area to be evaluated (S900). The mobile terminals may be placed uniformly in the evaluation area, or placed in a manner depending on an actual user distribution, importance of evaluation, or the like. Then, received-signal qualities of the mobile terminals at current positions are calculated (S910). More specifically, by use of plane-like radio-wave environment information, a received-signal quality is calculated based on radio-wave environment information of a neighboring area to a current position of a mobile terminal. Further, if there is no plane-like radio-wave environment information, the received-signal quality may be calculated by use of a well-known radio-wave propagation estimation formula such as Hata model. Note that when the received-signal qualities are calculated, a received-signal quality to each cell is individually calculated beforehand. Further, the fluctuation of radio waves such as fading or shadowing is simulated, and added to the received-signal qualities. Details of Hata model is described in NPL 2.

Subsequently, the operations of the base station and the mobile terminals at this time are simulated (S920). In the process of operation S920, the received-signal qualities calculated in operation S910 are taken into consideration. For example, it is assumed that a control signal is transmitted to a mobile terminal from the base station at this time. In this case, when the received-signal quality of a mobile terminal does not reach the quality that is required to perform a communication, the simulation is performed on the premise that the transmission of the control signal has failed.

Subsequently, the time is updated by a predetermined time step (S930), and according to the update of the time, the current positions of the mobile terminals are updated (S940). In the process of operation S940, a moving speed and a moving direction of the mobile terminals are taken into consideration. Note that, as the time step, for example, such values as 1 ms, 10 ms, 100 ms, and 1 s are used. The time step is determined depending on a target object for which an operation is simulated. Furthermore, it is determined whether or not end conditions of the simulation are satisfied (S950). When the end conditions are satisfied, handover properties of the respective mobile terminals are combined, so that handover properties of the whole area are calculated (S960). Ultimately, the simulation is ended. If the end conditions are not satisfied in operation S950, the process returns to operation S910. Examples of the end conditions of the simulation are that a time simulated on the simulation reaches a predetermined value, that the number of trial times of communication start and handover in a mobile terminal reaches a predetermined value, and that the number of failure times reaches a predetermined value.

PTL 1: Japanese Patent Application Laid-Open No. 2008-258855

NPL 1: Kobayashi and others, "3-Dimensional SON Simulator based on Realistic Radio Propagation and User Mobility," 2010 IEICE (The Institute of Electronics, Information and Communication Engineers) Communications Society, B-5-91, September, 2010.

NPL 2: M. Hata, "Empirical formula for propagation loss in land mobile radio services," IEEE Transactions on Vehicular Technology, vol. 29, no. 3, August 1980, p. 317-325.

NPL 3: Yoshio Hosoya (editorial supervision), "Radiowave propagation handbook," Realize Science & Engineering Center Co., Ltd., 1999, p. 209-210, p. 234-243.

NPL 4: "Method for point-to-area predictions for terrestrial services in the frequency range 30 MHz to 3000 MHz," ITU-R Recommendation, p. 1546-3.

The methods described in PTL 1 and NPL 1 include problems shown below. In the method described in PTL 1, the success or failure of the handover is estimated by use of radio-wave qualities of a source cell and a target cell at a start point and an end point of a handover. However, a radio-wave quality during the handover process is not considered.

Further, in the method described in PTL 1, plane-like radio-wave environment information is calculated by a well-known radio-wave propagation estimation method. The radio-wave environment information obtained by the well-known radio-wave propagation estimation method is a medium value of radio waves that fluctuate due to fading and shadowing. Thus, handover properties cannot be estimated which take into consideration the fluctuation of the radio waves.

In addition, in the method described in PTL 1, the success or failure of the handover is estimated at a certain spot, and therefore the handover properties over the whole area cannot be determined. Thus, the method described in PTL 1 cannot quantitatively calculate a handover properties such as a handover failure rate of a cell, for example.

In the method described in NPL 1, since the received-signal quality is calculated over time, the success or failure of the handover can be estimated even in consideration of the radio-wave quality during the handover process. Further, the fading and shadowing fluctuation can be also taken into consideration. In addition, measurements are taken over a broad service area, not only the success or failure of the handover at a certain spot, but also the handover properties over the whole area can be determined. Thus, the method described in NPL 1 can solve a problem of the method described in PTL 1.

However, the method described in NPL 1 has a problem that the simulation requires a great deal of time for calculation. Particularly, when events are evaluated in which a probability of occurrence such as the handover failure is around several percent at most, in order to obtain a statistical reliability, it is necessary to continue the simulation until a certain number of failures occur in various locations. Therefore, in order to analyze, for example, an evaluation area of a few kilometers in every direction, calculation time on the order of several hours or several days is required. In addition, in order to optimize a handover parameter, it is necessary to perform the simulation repeatedly while the handover parameter is changed to various values. In view of this, the time and man-hours required for the optimization are enormous. Thus, when the time available for the simulation is limited, there is a possibility that an optimum parameter is not obtained. This is because the number of trial times is limited.

SUMMARY

According to one of more exemplary embodiments, handover properties over a whole service area are estimated at high speed and with high accuracy.

According to one or more exemplary embodiments, a handover parameter is optimized at high speed and with high accuracy.

According to as aspect of an exemplary embodiment, a handover properties estimation system includes a moving-route extraction unit which extracts moving routes which pass through a handover area or a neighboring area, wherein the handover area is defined as an area in which a handover process occurs between cells in the mobile communication system. The moving routes are extracted from map information of the handover area or the neighboring area. A moving-route handover properties calculating unit calculates handover properties for the moving routes extracted by the moving-route extraction unit, by use of radio-wave environment information of the moving routes.

According to an aspect of another exemplary embodiment, a handover properties estimation method is provided including: extracting moving routes which pass through a handover area or a neighboring area, wherein the handover area is defined as an area in which a handover process occurs between cells in the mobile communication system. The moving routes are extracted from map information of the handover area or the neighboring area. Additionally, a handover properties of the moving routes thus extracted are calculated by use of radio-wave environment information of the moving routes.

According to an aspect of another exemplary embodiment, a computer readable information recording medium storing a handover properties estimation program is provided. When executed by a processor, the program performs a method including: extracting moving routes which pass through a handover area or a neighboring area, wherein the handover area is defined as an area in which a handover process occurs between cells in the mobile communication system. The moving routes are extracted from map information of the handover area or the neighboring area. The method further includes calculating handover properties of the moving routes thus extracted, by use of radio-wave environment information of the moving routes.

According to an aspect of another exemplary embodiment, a handover parameter optimization system is provided including: a moving-route extraction unit which extracts moving routes which pass through a handover area or a neighboring area, where the handover area is defined as an area in which a handover process occurs between cells in a mobile communication system. The moving routes are extracted from map information of the handover area or the neighboring area. The system further includes a moving-route handover properties calculating unit which calculates handover properties on the moving routes extracted by the moving-route extraction unit, by use of radio-wave environment information of the moving routes; a cell-to-cell handover properties calculating unit which calculates handover properties between the cells by combining the handover properties on the moving routes, which are calculated by the moving-route handover properties calculating unit; and a handover-parameter deriving unit which derives a handover parameter which achieves a best handover property based on the calculated handover properties between the cells.

According to an aspect of another exemplary embodiment, a handover parameter optimization method includes: extracting moving routes which pass through a handover area or an area neighboring the handover area, where the handover area is defined as an area in which a handover process occurs between cells in the mobile communication system, and where the moving routes are extracted from map information of the handover area or the neighboring area; calculating a handover properties of the moving routes thus extracted, by use of radio-wave environment information of the moving routes; calculating handover properties between the cells by combining a plurality of handover properties thus calculated; and deriving a handover parameter which achieves a best handover property, based on handover properties between the cells.

According to an aspect of another exemplary embodiment, a computer readable information recording medium storing a handover properties estimation program is provided. When executed by a processor, the program performs a method including: extracting moving routes which pass through a handover area or a neighboring area, wherein the handover area is defined as an area in which a handover process occurs between cells in the mobile communication system. The moving routes are extracted from map information of the handover area or the neighboring area. The method further includes calculating handover properties of the moving routes thus extracted, by use of radio-wave environment information of the moving routes; calculating handover properties between the cells by combining a plurality of handover properties thus calculated; and deriving a handover parameter which achieves a best handover property, based on handover properties between the cells.

One or more exemplary embodiments makes it possible to estimate a handover properties over a whole area at high speed and with high accuracy. Further, it is possible to optimize a handover parameter at high speed and with high accuracy.

BRIEF DESCRIPTION OF THE DRAWINGS

The above and/or other aspects will become apparent and more readily appreciated from the following description of exemplary embodiments, taken in conjunction with the accompanying drawings in which.

DESCRIPTION OF EMBODIMENTS

Exemplary Embodiment 1

Figure 1:
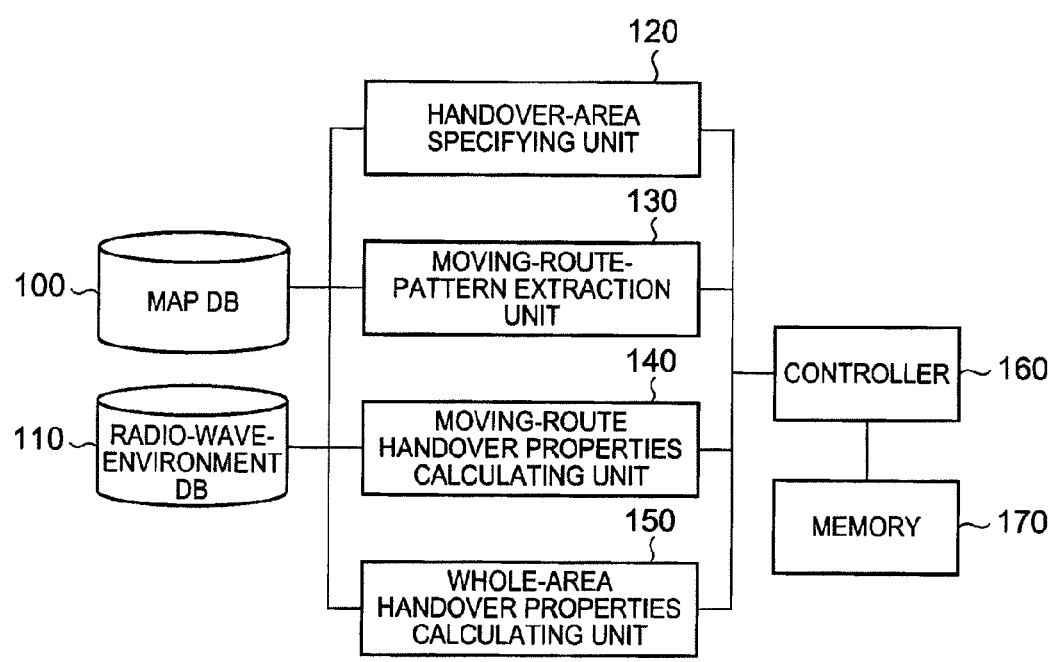
FIG. 1 is a block diagram showing an exemplary configuration of a handover properties estimation system of a first exemplary embodiment.

FIG. 1 is a block diagram showing an exemplary configuration of a handover properties estimation system of a first exemplary embodiment. The handover properties estimation system shown in FIG. 1 includes a map database (DB) 100, a radio-wave-environment DB 110, a handover-area specifying unit 120, a moving-route-pattern extraction unit 130, a moving-route handover properties calculating unit 140, a whole-area handover properties calculating unit 150, a controller 160, and a memory 170.

In the map DB 100, information including road information in an estimation-target area is stored. The road information is expressed as a set of line segments. In the map DB 100, coordinates of vertices of each of the line segments are stored in the form of latitudes/longitudes or as rectangular coordinates such as coordinates of a Universal Transverse Mercator (UTM) system or of a 19-coordinate system. Additionally, a flag or the like is provided to an intersection where roads intersect with each other, so that the relationships among the roads is clear. Further, in the map DB 100, information such as information indicative of a traffic volume on a road and information of road width, that is highly correlated with the traffic volume, may be stored.

In addition to the road information, the information stored in the map DB 100 can include information of buildings in the estimation-target area. The building information may be expressed as a polygon that represents the appearance of the building. In the map DB 100, coordinates of each vertex are stored in the form of latitudes/longitudes or as rectangular coordinates such as coordinates of a UTM system or of a 19-coordinate system. Further, the information stored in the map DB 100 can include information of the number of floors or the height of each building. Hereinafter, road information and building information may be collectively referred to as map information.

In the radio-wave-environment DB 110, information including radio-wave environment information of a target mobile communication system to be estimated in the estimation-target area is stored. More specifically, grid-like observation points are prescribed in the estimation-target area. In the radio-wave-environment DB 110, in association with each observation point, a position of the observation point, the height of the observation point, an ID to identify a cell, and radio-wave environment information of the cell are stored. Examples of the radio-wave environment information include electric field intensity, received-signal power, received-signal quality, path loss, a desired signal-power-to-noise-power ratio (SNR), and a desired signal-power-to-interference-power ratio (SIR).

The radio-wave environment information can be obtained, for example, by radio-wave propagation estimation or by actual measurement. Concrete examples the radio-wave propagation estimation methods include the Hata model (see NPL 2) and the Sakagami model (see NPL 3), which are commonly used in coverage area estimation of mobile communication systems, and the P.1546 model of ITU-R recommendations (see NPL 4). However, other methods which deterministically consider influences of reflection and diffraction by buildings and the ground in the estimation-target area can be also used. An example of the other methods is a ray tracing method (see NPL 3). By use of these estimation methods, the radio-wave environment information of each cell in the estimation-target area is estimated.

When the radio-wave environment information is actual-measurement data, data measured in each observation point in the estimation-target area may be used as the actual-measurement data. Based on the radio-wave environment information obtained by the radio-wave propagation estimation, estimation data may be corrected by use of the actual-measurement data.

In the radio-wave environment information, indoor radio-wave environment information and outdoor radio-wave environment information can be distinguished from each other. For example, in the radio-wave-environment DB 110, with respect to an observation point placed inside a building, radio-wave environment information taking into consideration a loss when a radio wave comes into the building is stored, and with respect to an observation point outside the building, radio-wave environment information obtained outdoors is stored. Note that an identifier for identifying whether the radio-wave environment information is outdoor radio-wave environment information or indoor radio-wave environment information may be given to each observation point.

By use of radio-wave environment information stored in the radio-wave-environment DB 110, the handover-area specifying unit 120 specifies, as a handover area, an area on which a handover process from a certain cell to another cell in the estimation-target area is performed. Note that the handover area is not limited to an area where the whole of the handover process occurs. The handover area may include an area where only a part of the handover process occurs. Thus, the handover area may not necessarily be an area having a width. The handover area can be defined as a boundary line itself that would be a trigger to some sort of process (which is not only an initiation process, but may be a halfway process or an end process) for a handover from a certain cell to another cell in the estimation-target area. Of course, the handover area may be defined as an area including an area a few meters forward from the boundary line (or within a cell area), or an area in which from a certain process to a certain process are performed. In other words, the handover area may be defined as an area having a width.

The handover-area specifying unit 120 may specify, as the handover area, for example, an area in which at least a part of the handover process from a certain cell to another cell in the estimation-target area is performed, or a boundary line to the area. Note that when the handover area is specified, which process in the handover process will be a target may be specified beforehand, or may not to be specified. For example, the handover area may be specified as an area in which any process in the handover process from a certain cell to another cell in the estimation-target area is performed, or as a boundary line to the area.

The moving-route-pattern extraction unit 130 extracts, from map information stored in the map DB 100, moving routes which pass through the handover area extracted by the handover-area specifying unit 120 or through an area neighboring the handover area. The moving-route-pattern extraction unit 130 extracts, for example, from map information of the handover area or its neighboring area, moving routes which pass through an area in which the handover process occurs, that is, routes during which the handover process occurs. Note that when the handover area is defined as an area with a width, the moving-route-pattern extraction unit 130 may extract, as the moving routes, not only a route which completely passes through an extracted handover area or its neighboring area, but also a route that is destined for the area.

With the use of radio-wave environment information on a moving route, the moving-route handover properties calculating unit 140 calculates handover properties when a user who communicates using a mobile terminal moves on the moving route. The moving-route handover properties calculating unit 140 calculates the handover properties for the moving routes extracted by the moving-route-pattern extraction unit 130.

The whole-area handover properties calculating unit 150 combines handover properties on respective moving routes, which are calculated by the moving-route handover properties calculating unit 140, and therewith calculates handover properties of the whole area.

The controller 160 controls the handover-area specifying unit 120, the moving-route-pattern extraction unit 130, the moving-route handover properties calculating unit 140, and the whole-area handover properties calculating unit 150. The memory 170 is a storage device for storing therein data for operations.

In the present exemplary embodiment, the controller 160, the handover-area specifying unit 120, the moving-route-pattern extraction unit 130, the moving-route handover properties calculating unit 140, and the whole-area handover properties calculating unit 150 are realized, for example, by a CPU that works according to a program.

Figure 2:
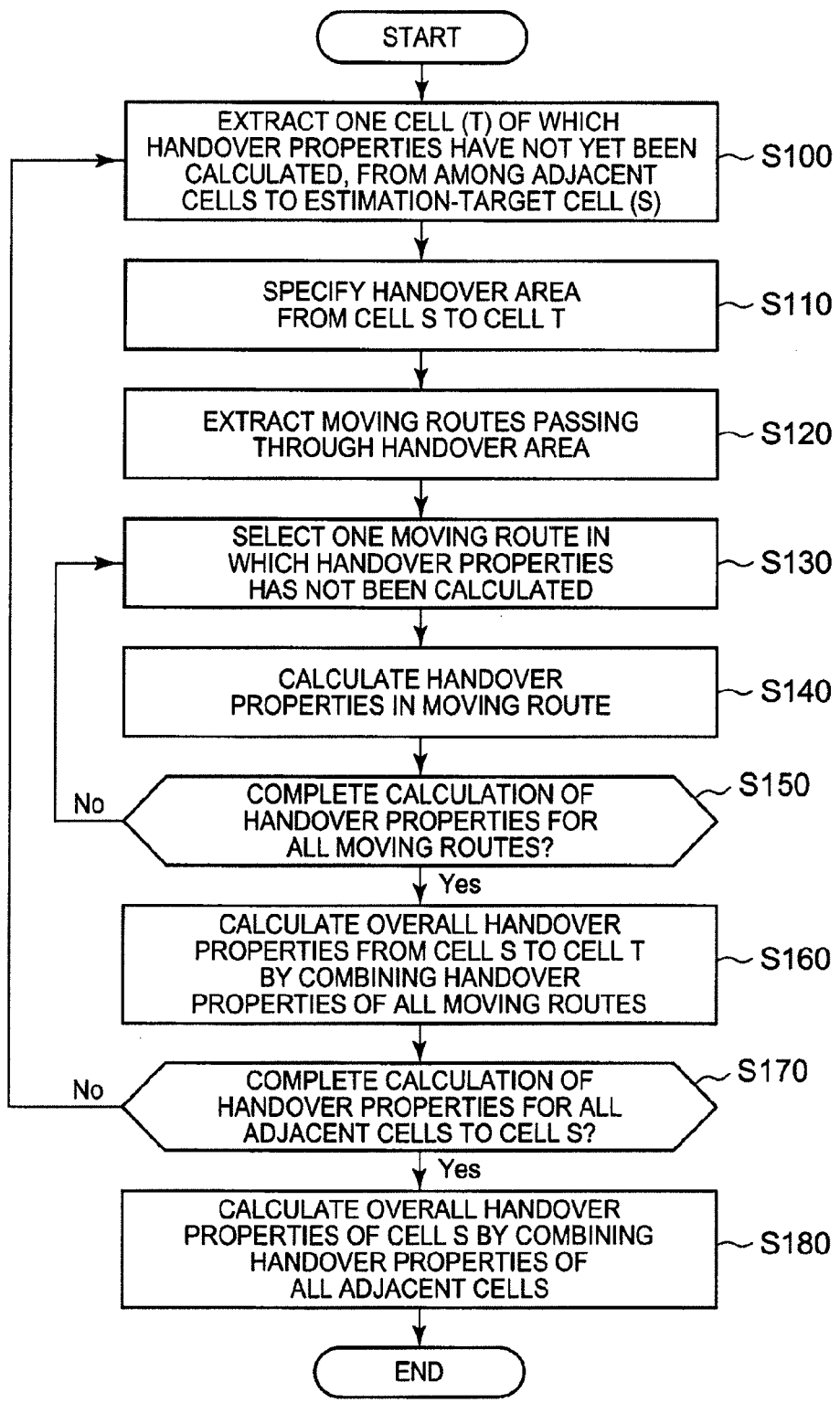
FIG. 2 is a flowchart showing an example of an operation of the handover properties estimation system of the first exemplary embodiment.

Next will be described an operation of the present exemplary embodiment. FIG. 2 is a flowchart showing an example of the operation of the handover properties estimation system of the present exemplary embodiment. FIG. 2 exemplifies an operation to estimate a handover properties of an estimation-target cell (herein, referred to as a cell S), placed in an evaluation area, for which estimation-target cell the handover properties is estimated.

In the example shown in FIG. 2, the controller 160 initially extracts, from cells adjacent to the cell S, a cell for which handover properties have not yet been calculated (S100). The adjacent cells are cells registered with the cell S as cells to which a handover from the cell S is possible. Hereinafter, an extracted adjacent cell is referred to as a cell T.

Subsequently, the handover-area specifying unit 120 specifies an area in which the handover process from the cell S to the cell T is performed by use of radio-wave environment information stored in the radio-wave-environment DB 110 (S110).

Figure 3:
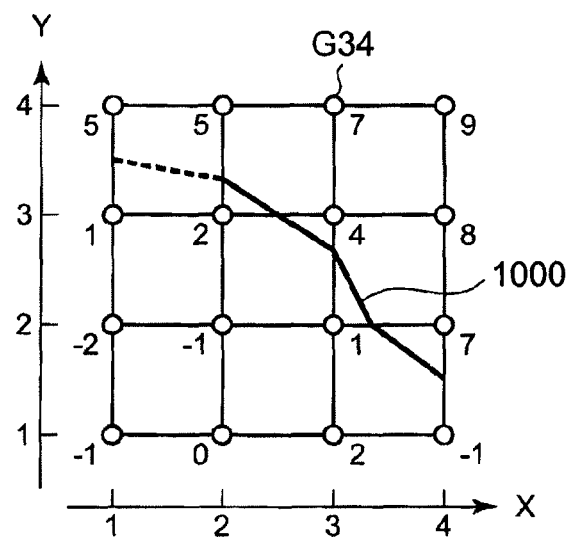
FIG. 3 is an explanatory view to describe a handover-area specification method in the first exemplary embodiment.

FIG. 3 is an explanatory view to describe a handover-area specification method. FIG. 3 shows a smaller area within the evaluation area. Note that a white circle in the figure indicates a point for which radio-wave environment information is stored. Herein, as shown in FIG. 3, radio wave environment data are given in a grid-like manner in the evaluation area. Hereinafter, in order to identify each lattice point, numbers are assigned in X-axis and Y-axis directions, and a lattice point of which a position on the X-axis is x and a position on the Y-axis is y is represented as Gxy. For example, a lattice point of which a position on the X-axis is 3 and a position on the Y-axis is 4 is represented as G34.

Figure 12:
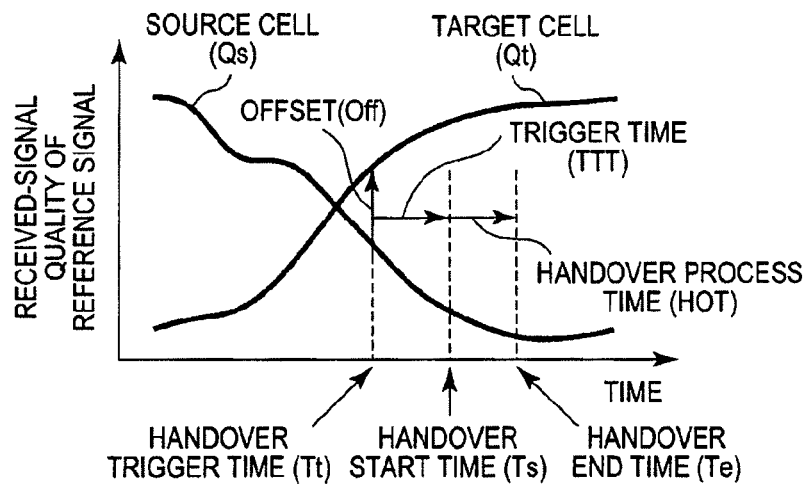
FIG. 12 is an explanatory view to describe an operation of a handover in an LTE system.

In the radio-wave-environment DB 110, received-signal qualities of the cell S and the cell T are stored as radio-wave environment information in association with each lattice point. In FIG. 3, a value noted near a lattice point is a value obtained by subtracting a received-signal quality (Qs) of a source cell (the cell S) from a received-signal quality (Qt) of a target cell (the cell T). As has been described by referring to FIG. 12, a time when Qt is larger than Qs by the offset (Off) is a trigger for a handover. In other words, a position where Qt−Qs=Off is a position which triggers a handover from the cell S to the cell T. In FIG. 3, for example, a set of spots that will be handover triggers when Off=3 is shown as a line 1000. The line 1000 is equivalent to a contour line of Qt−Qs=3. The handover-area specifying unit 120 specifies, as a handover area, the contour line of the handover opportunity obtained as such. Herein, the handover area is defined as a boundary line to an area in which the handover process from a certain cell to another cell in the estimation-target area starts.

Note that, in an actual environment, other cells exist as well as the cell S and the cell T. Therefore, the area of Qt−Qs=Off may be handed over to a cell which is not the cell T, and the trigger to the handover to the cell T may not occur in some occasions. The handover-area specifying unit 120 can specify a handover area in consideration of such a phenomenon.

As an example, the handover-area specifying unit 120 draws a contour line of a handover opportunity to all adjacent cells to the cell S, and specifies only a part selected as a contour line of Qt−Qs=Off, as the handover area from the cell S to the cell T based on the inclusion of a plurality of contour lines. Further, at a certain lattice point, in a case where Qt' is a received-signal quality of a cell T', which is not the cells S and T, when Qt'−Qs is larger than Qt−Qs by a predetermined value, the handover-area specifying unit 120 may not specify the certain lattice point as the handover area.

In the example shown in FIG. 3, since Qt'−Qs at G13, G14, G23, and G24 are larger than of Qt−Qs (=1, 5, 2, 5) by a predetermined value, the area surrounded by those lattice points is excluded from the handover area from the cell S to the cell T (shown by a dotted line in the figure).

The technique that uses the contour line of a handover opportunity when the handover area from the cell S to the cell T is specified is exemplified above. However, the method to specify the handover area is not limited to this technique. For example, a contour line of end spots of a handover area is drawn based on a moving speed and a moving direction of a user, and an area between the contour line of the handover opportunity and the contour line of the end spots may be specified as the handover area. Further, the handover-area specifying unit 120 may not use the radio-wave environment information, but rather the handover trigger may occur at a position where a distance difference between the cell S and the cell T is a predetermined value. In that case, the handover-area specifying unit 120 specifies a contour line of a handover trigger obtained based on the distance difference between the cell S and the cell T as the handover area.

When the handover area is specified, the moving-route-pattern extraction unit 130 extracts moving routes which pass through the handover area specified in operation S110 or its neighboring area from map information (S120).

Figure 4:
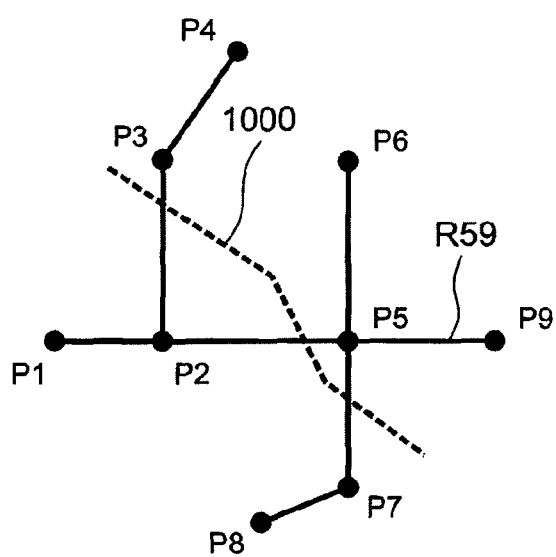
FIG. 4 is an explanatory view to describe a first method for extracting a moving route in the first exemplary embodiment.

FIG. 4 is an explanatory view to describe a first method for extracting a moving route. In FIG. 4, a line 1000 is specified as the handover area, and road information of its neighboring area is shown. In FIG. 4, an area on the bottom-left side of the line 1000 is an area in which a mobile terminal is connected to a source cell, while an area on the upper-right side of the line 1000 is an area in which the handover process is performed and an area in which a mobile terminal is connected to a target cell. In each line segment constituting a road, numbers are given to its vertices. Further, a route from a vertex Px to a vertex Py is represented as Rxy. For example, a road segment constituted by vertices P5 and P9 is represented as R59. Further, a route ending at P6 from a vertex P2 through the vertex P5 is represented as R256.

In operation S120, the moving-route-pattern extraction unit 130 extracts a road segment which intersects the handover area, as a moving route which passes through the handover area. In the example shown in FIG. 4, R23, R25, and R75 are extracted. However, it should be taken into consideration that some distance may be required from when a handover trigger occurs until the handover process is completed, and that, in an actual radio-wave environment, a fluctuation is caused by fading and shadowing in radio-wave environment information which is used when the handover area is specified. For example, a margin can be provided in front and behind a road segment which intersects the handover area (that is, at both end points of the road segment). The margin amount to be given may be a number of road segments, or a distance from an intersection of the road segment with the handover area.

In the example shown in FIG. 4, it is assumed that a margin of one road segment is given in front and behind each of the routes (R23, R25, and R75) which have been extracted earlier. In this case, road segments to be extracted are R1234, R1256, R1257, R1259, R8752, R8756, and R8759. Further, the margin amount to be given can be prescribed according to a moving speed assumed in a corresponding road. For example, when a margin is given to a road segment that is very wide, it is estimated that the moving speed of a mobile terminal which moves on the road is fast, and the margin amount to be given is set slightly larger.

Figure 5:
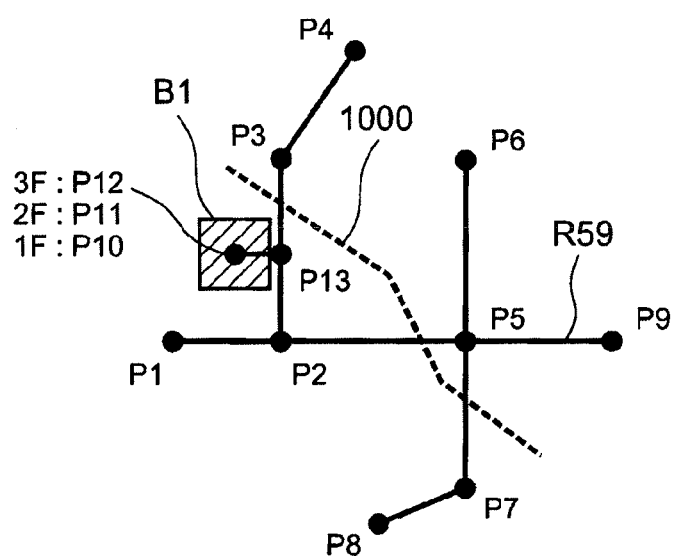
FIG. 5 is an explanatory view to describe a second method for extracting a moving route in the first exemplary embodiment.

Note that moving routes are extracted based on road information, in the example shown in FIG. 4. However, an actual mobile terminal may move indoors. Thus, the moving routes can be extracted in consideration of indoor moving. More specifically, the moving routes may be extracted according to the following procedures. FIG. 5 shows an environment including a building B1 as well as the road configuration shown in FIG. 4. It is assumed that the building B1 is a three-story building. The respective floors of the building B1 are provided with a vertex P10 (the first floor), a vertex P11 (the second floor), and P12 (the third floor). A vertex (in this example, P10) corresponds to a floor where there is the entrance of the building is connected to its nearest road segment, and a vertex of an obtained line segment is defined as a new intersection (P13). Accordingly, a moving-route extraction process can be performed in the same manner as in the aforementioned state where there are only roads. When the moving-route extraction process is performed, R(10) (13)34 is also extracted as a road segment, in addition to R1234, R1256, R1257, R1259, R8752, R8756, and R8759 described above.

Note that, in the example shown in FIG. 5, each floor is provided with one vertex, but each floor may be provided with a plurality of vertices. For example, a moving path between floors may be included in the moving routes. Further, one vertex may be provided to a plurality of floors or a plurality of buildings.

When the moving routes are extracted, the controller 160 selects one moving route in which the calculation of a handover properties is not performed, from among the moving route patterns extracted in operation S120 (S130).

Then, the moving-route handover properties calculating unit 140 calculates handover properties in the moving route thus selected (S140). The moving-route handover properties calculating unit 140 calculates, as the handover properties in the moving route, handover properties on the moving route, that is, handover properties of a mobile terminal which moves over the moving route. Note that a handover property which is calculated in operation S140, may be a handover failure rate (=the number of handover failures/the trail number of handovers). Alternatively, like Ping Pong Handover, an index which indicates that there is no handover failure (unusual disconnection) and which takes into consideration an element that should be recognized as a handover problem may be used.

Figure 6:
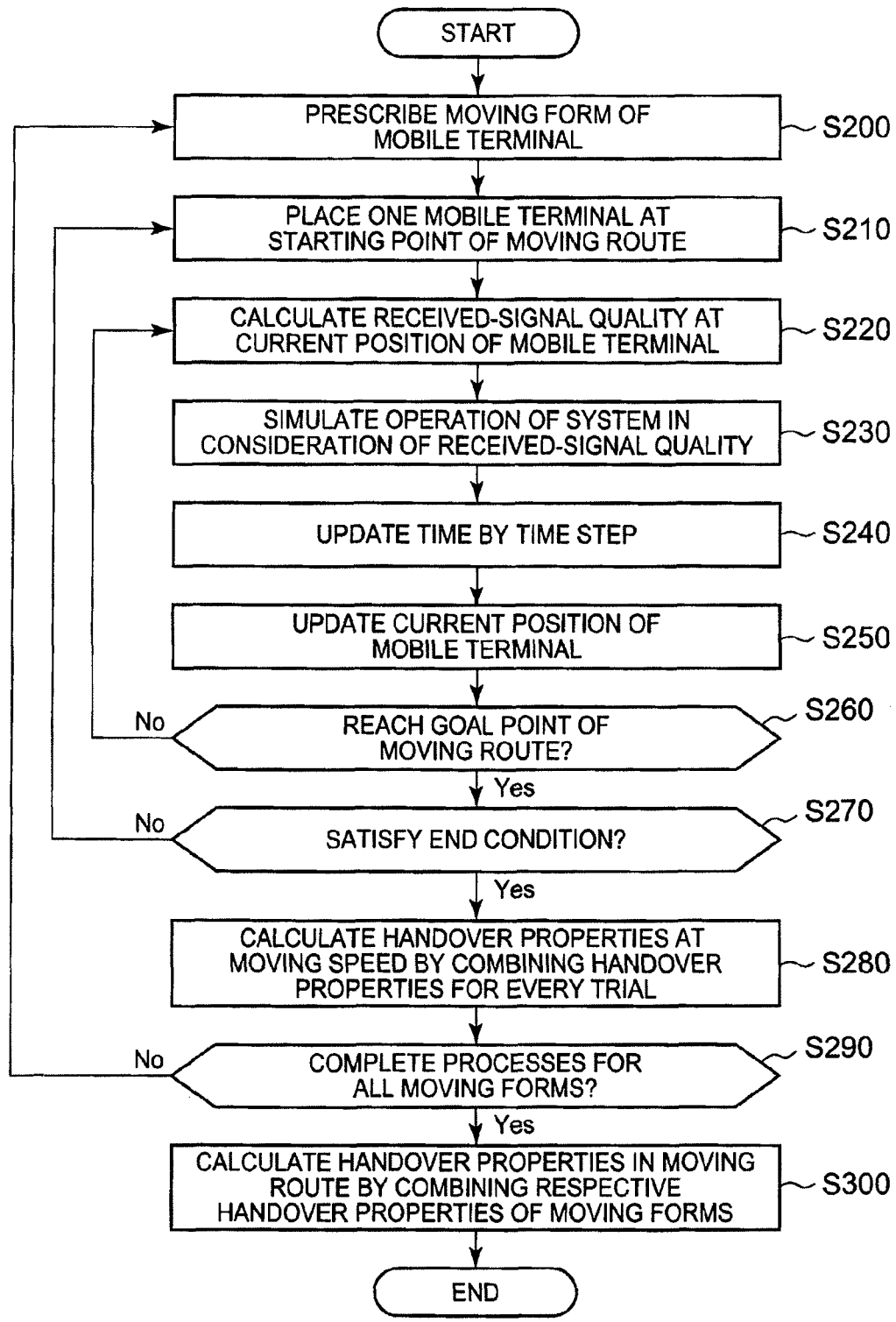
FIG. 6 is a flowchart showing a first method for implementing a process of calculating a handover properties on a moving route in the first exemplary embodiment.

FIG. 6 is a flowchart showing a first method for implementing a process of calculating handover properties on a moving route in operation S140. The method shown in FIG. 6 is a method for calculating handover properties on a moving route by a dynamic simulation in which a moving area of a mobile terminal is limited to the moving route.

In the method shown in FIG. 6, the moving-route handover properties calculating unit 140 initially prescribes a moving form of the mobile terminal which moves on the route (S200). More specifically, the moving-route handover properties calculating unit 140 prescribes one moving form from among all moving forms, such as a car and a walker, that are assumed to move on the route.

Then, the moving-route handover properties calculating unit 140 places one mobile terminal at a starting point of the moving route (S210). The mobile terminal moves from the starting point towards a goal point over the moving route at a moving speed according to the moving form prescribed in operation S200. In the case of the dynamic simulation shown in FIG. 13, a plurality of mobile terminals may be placed over the whole evaluation area. However, in the present technique, only one mobile terminal is placed. The placement position is limited to the starting point. Further, in general, a moving route is selected at random when the dynamic simulation is employed. However, in the present technique, the mobile terminal moves from a starting point toward a goal point over a specific moving route.

Subsequently, the moving-route handover properties calculating unit 140 calculates a received-signal quality at a current position of the mobile terminal (S220). At that time, the fluctuation of radio waves such as fading or shadowing is simulated. For example, a radio-wave fluctuation is simulated by prescribing a variable factor by a random number. It is known that a shadowing fluctuation follows a normal distribution. In view of this, an effect of the shadowing may be simulated by giving, to radio-wave information, a normal random number that assumes an average or variance as a predetermined value. Note that the simulation method of the radio-wave fluctuation is not limited to this. Thus, the fluctuation of radio waves is added to the received-signal quality.

Further, in operation S220, when the current position of the mobile terminal is inside a building, the received-signal quality is calculated by use of radio-wave environment information at an indoor observation point among neighboring observation points. On the other hand, when the current position of the mobile terminal is outside a building, the received-signal quality is calculated by use of radio-wave environment information at an outdoor observation point among the neighboring observation points.

Then, the moving-route handover properties calculating unit 140 simulates operations of a base station and the mobile terminal at this time in consideration of the received-signal quality calculated in operation S220 (S230). Subsequently, the moving-route handover properties calculating unit 140 updates the time by a predetermined time step (S240). The moving-route handover properties calculating unit 140 updates the current position of the mobile terminal according to the moving speed and the moving direction of the mobile terminal along with the update of the time (S250). Note that the processes from operation S220 to operation S250 are the same as the processes from operation S910 to operation S940 in the dynamic simulation shown in FIG. 13, and therefore are not explained here.

Then, the moving-route handover properties calculating unit 140 determines whether the mobile terminal has reached the goal point of the moving route (S260). When the mobile terminal has not reached the goal point yet, the moving-route handover properties calculating unit 140 returns to operation S220. When the mobile terminal has reaches the goal point, the moving-route handover properties calculating unit 140 judges whether or not an end condition of the simulation for the moving form is satisfied (S270). The end condition is that the fluctuation of radio waves, such as fading or shadowing, is averaged sufficiently. More specifically, that the number of trials reaches a predetermined value is used as the end condition.

When the end condition is satisfied in operation S270, the moving-route handover properties calculating unit 140 calculates handover properties for the moving form by combining handover properties for every trial (S280). On the other hand, when the end condition is not satisfied, the moving-route handover properties calculating unit 140 returns to operation S210.

Subsequently, the moving-route handover properties calculating unit 140 determines whether those processes are completed for all moving forms (S290). When they are completed for all moving forms, the moving-route handover properties calculating unit 140 calculates handover properties in the moving route by combining respective handover properties of the moving forms (S300). The handover properties may be combined by weighing the moving forms in consideration of the difference in a traffic volume assumed in each of the moving forms. For example, when the ratio of walkers and cars moving over the moving route per unit time is 1:3, these values may be assumed as weighting factors to the respective moving forms. When any moving form to which the processes are not completed yet is left, the raveling-route handover properties calculating unit 140 returns to operation S200.

Figure 7:
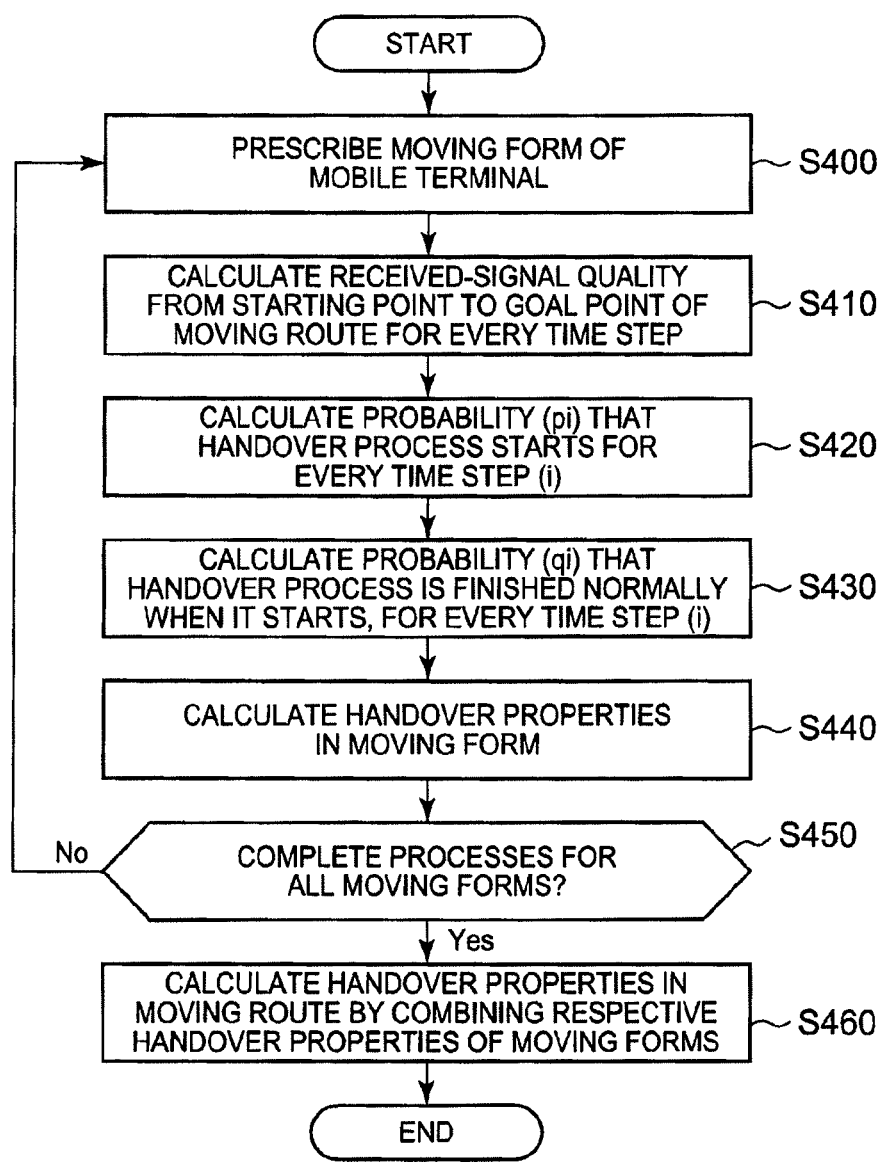
FIG. 7 is a flowchart showing a second method for implementing a process of calculating a handover properties on a moving route in the first exemplary embodiment.

FIG. 7 is a flowchart showing another method for implementing a process of calculating the handover properties on the moving route in operation S140. The method shown in FIG. 7 is a method for calculating handover properties on a moving route by a static simulation based on radio-wave environment information on the moving route.

In the method shown in FIG. 7, similarly to operation S200 shown in FIG. 6, the moving-route handover properties calculating unit 140 initially prescribes a moving form of a mobile terminal moving on the route (S400). Then, the moving-route handover properties calculating unit 140 calculates, for every time step, a received-signal quality from a starting point to a goal point of the moving route (S410). The moving-route handover properties calculating unit 140 calculates a received-signal quality for every predetermined time step (e.g., 1 ms, 10 ms, 100 ms, and 1 s) according to the moving speed of the moving form prescribed in operation S400 by use of radio-wave environment information stored in the radio-wave-environment DB 110.

When the current position of the mobile terminal at a certain time step is inside a building, the moving-route handover properties calculating unit 140 calculates the received-signal quality by use of radio-wave environment information at an indoor observation point among neighboring observation points. When the current position of the mobile terminal at a certain time step is outside a building, the moving-route handover properties calculating unit 140 calculates the received-signal quality by use of radio-wave environment information at an outdoor observation point among neighboring observation points.

Then, the moving-route handover properties calculating unit 140 finds, for every time step, a probability $p_i$ that a handover starts at the time step i (S420). When the received-signal quality (Qt) of the target cell is larger than the received-signal quality (Qs) of the source cell by an offset (Off) and this continues for a trigger time (TTT) before the time i, the handover starts at the time step i. Thus, a probability $p_i$ is given by the following Formula (1):

$$p_i = \prod_{n=1}^{\lceil TTT/\Delta t \rceil} Pr(Qt - Qs > \text{Off})_{i-n}. \quad \text{Formula (1)}$$

Here, $\Delta t$ indicates the aforementioned predetermined time step, and $Pr(Qt-Qs>\text{Off})_k$ indicates a probability of $Qt-Qs>\text{Off}$ at a time step k. Further, $\lceil x \rceil$ on mark $\Pi$ indicates the smallest integer which is greater than x. Note that, in Formula (1), it is said that the radio-wave fluctuation for every time step has no correlation.

Note that a probability that a value of a variable which fluctuates according to a certain probability density function is greater than a predetermined value is given by a mathematical formula. For example, in a case of a random number that follows a normal distribution with an average value of $a_0$ and a variance of $\sigma^2$, a probability f(a) that a value of its variable is greater than a is given by the following Formula (2):

$$f(a) = \frac{1}{2}\text{erfc}\left(\frac{a - a_0}{\sqrt{2}\,\sigma}\right). \quad \text{Formula (2)}$$

The fluctuation of radio waves by shadowing can be assumed by the normal distribution, so that a probability of $Qt-Qs>\text{Off}$ at a predetermined time step can be calculated by use of the following Formula (3). When calculating the probability, the moving-route handover properties calculating unit 140 obtains an average value ($\text{Off}_0$) of Qt–Qs at this time based on radio-wave environment information stored in the radio-wave-environment DB 110. Further, a standard deviation of the shadowing fluctuation is assumed by $\sigma s$.

$$Pr(Qt - Qs > \text{Off}) \frac{1}{2}\text{erfc}\left(\frac{\text{Off} - \text{Off}_0}{\sqrt{2}\,\sigma_s}\right) \quad \text{Formula (3)}$$

Then, when the handover process starts at the time step i, the moving-route handover properties calculating unit 140 calculates a probability $q_i$ that the process is finished normally (S430). The moving-route handover properties calculating unit 140 calculates it for every time step. When an average received-signal quality during a handover process time (HOT) after the time step i is not less than a predetermined value, it is assumed that the handover process started at the time step i is finished normally. In that case, a probability that the handover process succeeds is given by the following Formula (4):

$$q_i = Pr(Qs_{ave} > Th) - Pr(Qt_{ave} > Th) \quad \text{Formula (4).}$$

$Qs_{ave}$ and $Qt_{ave}$ respectively indicate average received-signal qualities of the source cell and the target cell over the handover process time (HOT) after the time step i. Further, Th is a threshold value for the handover process to be completed normally. Further, Pr (Qs$_{ave}$>Th) and Pr(Qt$_{ave}$>Th) indicate a probability of Qs$_{ave}$>Th and a probability of Qt$_{ave}$>Th, respectively. These values can be also found analytically, similarly to the case of Formula (2) mentioned above.

Note that the same threshold value Th is used in Formula (4) with respect to Qs and Qr, but different threshold values may be applied to them. Note that as the threshold value Th for the handover process to be completed normally, for example, a received-signal quality that enables a communication in a mode in which a transmission rate is the lowest may be used. Further, the dynamic simulation on the moving route may be performed to find a relation between a received-signal quality and a handover completion rate, and a received-signal quality that allows the handover completion rate to be not less than a predetermined value may be used.

Further, the moving-route handover properties calculating unit 140 calculates handover properties in the moving form (S440). For example, by use of p$_i$ and q$_i$, the handover failure rate (Handover Fail Rate; HFR) is given by the following Formula (5):

$$HFR = \sum_{i=1}^{I} \left\{ p_i \prod_{n=1}^{i-1}(1-p_n) \right\}(1-q_i) \Bigg/ \sum_{i=1}^{I} \left\{ p_i \prod_{n=1}^{i-1}(1-p_n) \right\}. \quad \text{Formula (5)}$$

Here, I indicates the total number of time steps. The bracket in Formula (5) indicates a probability that a handover starts at a time step i for the first time. Note that, in Formula (5), a handover which starts on a moving route is assumed only once.

Subsequently, similarly to the process of operation S290 in FIG. 6, the moving-route handover properties calculating unit 140 determines whether the processes are completed for all moving forms (S450). When they are completed for all moving forms, similarly to the process of operation S300 in FIG. 6, the moving-route handover properties calculating unit 140 calculates handover properties in the moving route by combining respective handover properties for the moving forms (S460). If any moving form to which the processes are not completed yet is left in operation S450, the moving-route handover properties calculating unit 140 returns to operation S400.

The method for calculating handover properties shown in FIG. 6 and the technique for calculating handover properties shown in FIG. 7 are the same in that a received-signal quality when a mobile terminal goes along a moving route is calculated for every predetermined time step, and handover properties in the moving route are calculated by use of calculated received-signal qualities.

Note that in the method shown in FIG. 6, the handover properties in the moving route are calculated in such a manner that a received-signal quality to which an effect of a radio-wave fluctuation is given by a random number is calculated for every time step, and a process of simulating a system operation based on the received-signal quality is performed several times while the random number is changed. In the technique shown in FIG. 7, a probability that a handover process starts is calculated analytically for every time step, and when the handover process starts, a probability that the handover process is finished normally is calculated analytically, thereby calculating the handover properties in the moving route by use of the calculated handover-process starting probability and the calculated handover-process normal-end probability. In the technique shown in FIG. 7, it is not necessary to calculate the fluctuation of radio waves repeatedly. Thus, the process is expected to be faster in comparison with the technique shown in FIG. 6.

When calculating the handover properties in one moving route selected, the moving-route handover properties calculating unit 140 judges whether or not the calculation process of handover properties is completed for all moving routes extracted in the process of operation S120 (S150). When the process is not completed, the operation of the handover properties estimation system returns to operation S130, and a next moving route is selected.

When the calculation process of a handover properties is completed for all moving route, the whole-area handover properties calculating unit 150 calculates overall handover properties from the cell S to the cell T by combining handover properties of all moving routes (S160). The handover properties may be combined by weighing the moving routes in consideration of the difference in a traffic volume assumed in each of the moving routes. For example, it is assumed that the traffic volume of a moving route is proportional to an average value of road widths of the moving route, and the average value of road widths of each of the moving routes may be assumed as a weighting factor for each of the moving routes.

The controller 160 judges whether or not the calculation process of overall handover properties is completed for all adjacent cells to the cell S (S170). When the calculation process is not completed for all adjacent cells, the operation of the handover properties estimation system returns to operation S100, and a next adjacent cell for which handover properties are not calculated is extracted.

When the calculation process of handover properties is completed for all adjacent cells to the cell S (Yes in operation S170), the whole-area handover properties calculating unit 150 calculates overall handover properties of the cell S by combining handover properties for all adjacent cells to the cell S (S180). The handover properties may be combined by weighing the handover properties in consideration that different cell pairs have different handover amounts.

For example, when it is assumed that an amount of handovers to occur is proportional to the dimension of a handover area calculated in terms of a given cell pair, the whole-area handover properties calculating unit 150 may take the dimension of a handover area of each cell pair as a weighting factor to the each cell pair. Alternatively, when it is assumed that an amount of handovers to occur is proportional to a total of average road widths of moving routes extracted for each cell pair, an average value of the average road widths of the moving routes for the each cell pair may be taken as a weighting factor to the each cell pair.

Note that FIG. 2 shows the process for estimating handover properties of the cell S. When an estimation target is only handover properties from the cell S to a single cell T, only corresponding operations are performed among the operations shown in FIG. 2.

On the other hand, when a handover properties in the whole evaluation area is to be calculated, the process shown in FIG. 2 is performed for all cells included in the evaluation area.

Figure 13:
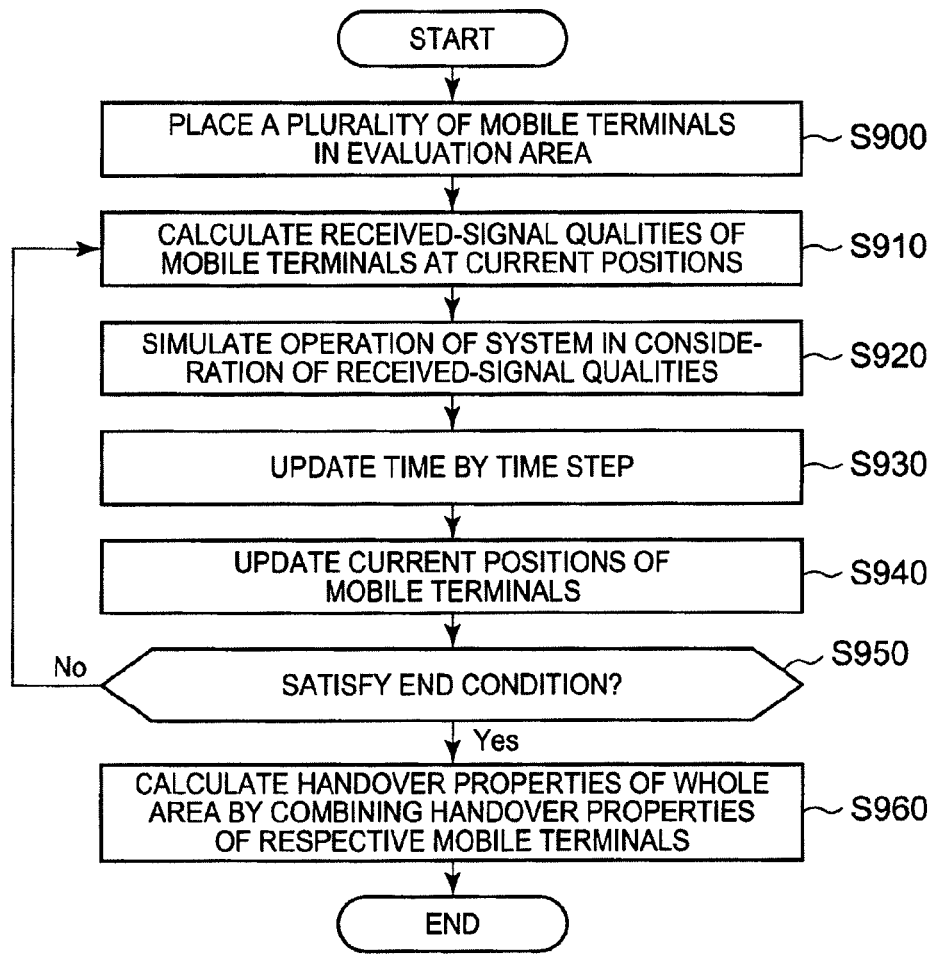
FIG. 13 is an explanatory view to describe a handover properties estimation method by a dynamic simulation.

In the present exemplary embodiment, it is possible to estimate the handover properties at high speed in comparison with the general dynamic simulation shown in FIG. 13. This is because a target point to be evaluated is limited to an area in which a handover process occurs, more specifically, moving routes which pass through a handover area regarded as the area in which the handover process occurs. Further, in the dynamic simulation, in order to probabilistically secure a statistical reliability to a road with few trials of the handover, it is necessary to continue the simulation in a whole area until the number of handover trials on the road reaches a predetermined number of times. However, in the method of the present exemplary embodiment, the simulation may be repeated only a prescribed number of times for each moving route. From this point, it is possible to estimate the handover properties at a high speed. In addition, in the present exemplary embodiment, the handover properties on a moving route are calculated by a static simulation. Since the dynamic simulation is not performed, the estimation process of the handover properties is performed faster.

Exemplary Embodiment 2

Figure 8:
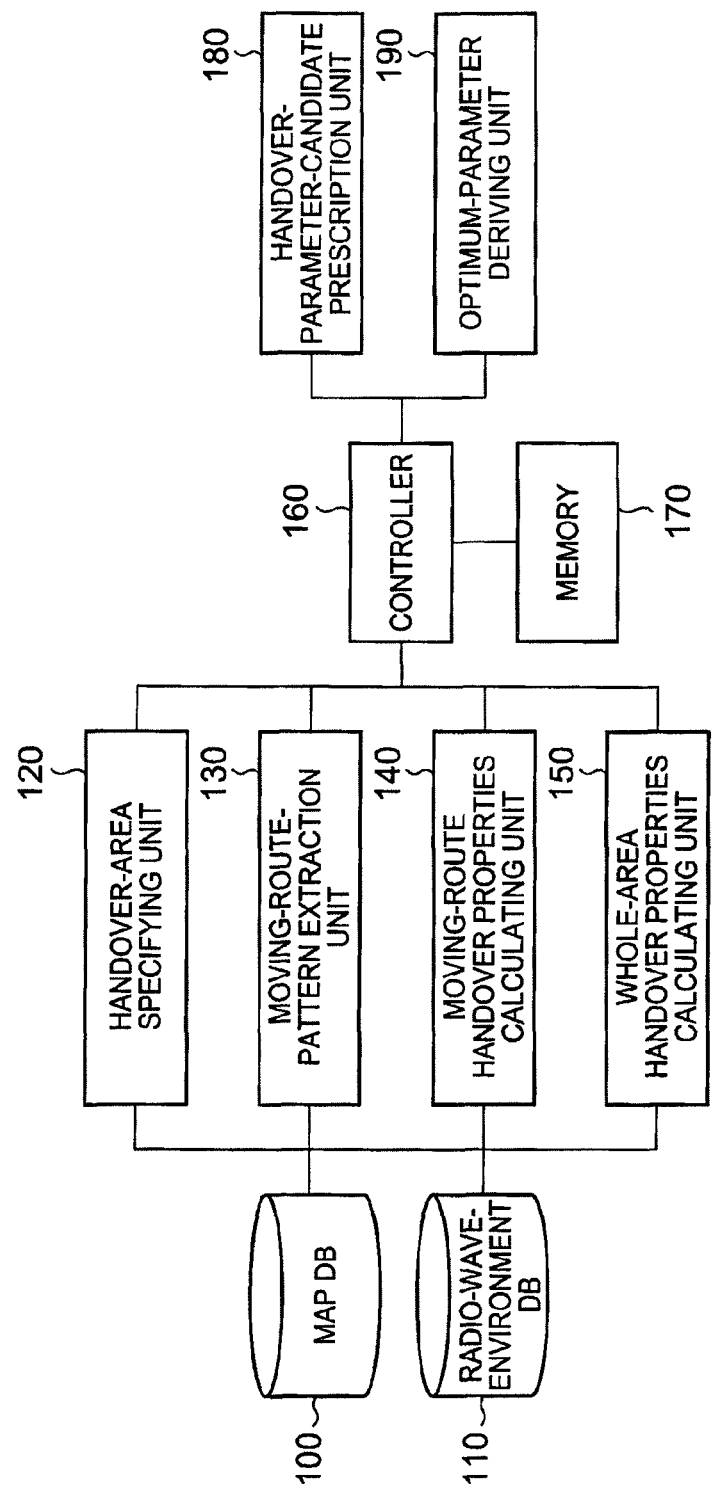
FIG. 8 is a block diagram showing an exemplary configuration of a handover properties estimation system of the second exemplary embodiment.

The second exemplary embodiment is described below. FIG. 8 is a block diagram showing an exemplary configuration of a handover parameter optimization system of the second exemplary embodiment of the present invention. The handover parameter optimization system shown in FIG. 8 includes a handover-parameter-candidate prescription unit 180 and an optimum-parameter deriving unit 190, in addition to the configuration of the handover properties estimation system shown in FIG. 1.

The handover-parameter-candidate prescription unit 180 prescribes a type of a handover parameter to be optimized and candidates of its value. The handover-parameter-candidate prescription unit 180 targets a single cell or a plurality of cells for optimization of a handover parameter. Hereinafter, a target cell for the optimization of a handover parameter is referred to as an optimization target cell. When a plurality of cells are regarded as optimization target cells, the handover-parameter-candidate prescription unit 180 prescribes candidates for a handover parameter individually for all cells.

There are mainly the following two methods as an application method of the system of the present exemplary embodiment. In the first application method, a cell for which a handover quality falls below a required value during the operation of a target mobile communication system is detected, and the cell is assumed as an optimization target cell. In the second application method, before the operation of a target mobile communication system, one or more cells in an evaluation area are assumed as an optimization target cell.

In the former application method, candidates for a handover parameter to be optimized can be prescribed after a detailed handover quality of the optimization target cell is determined. For example, when Too Late Handover occurs frequently in the optimization target cell, the system can be controlled toward a handover starting early. Therefore, when a target parameter to be changed is assumed as an offset (Off), a candidate for a value of the offset (Off) is prescribed, for example, as C−10<Off<C. Here, C is an offset that has not been changed in the optimization target cell. Further, information (e.g., measurement information in a mobile terminal) concerning a current handover quality is used as an input of the handover parameter optimization system.

In the latter application method, for example, values approximate to a default value are prescribed as candidates for a handover parameter. When a target parameter to be changed is assumed as an offset value (CIO) peculiar to a cell, a candidate for a value of the offset value (CIO) is prescribed, for example, as D−5<CIO<D+5. Here, D is a default value of the CIO.

Note that the target handover parameter to be optimized is not limited to the offset (Off) and the offset value (CIO) peculiar to a cell. The handover parameter includes a trigger time (TTT) and other parameters associated with the handover.

Further, as the information concerning the handover quality of the optimization target cell, for example, handover quality information managed per cell in an operation management system (not shown) connected via a network may be obtained. Based on information from a terminal which really performs a handover process, the operation management system counts the number and rate of failures of handovers which occur in the cell, per type of the handover process, such as Too Early Handover and Too Late Handover. For example, the handover-parameter-candidate prescription unit 180 sends a request to the operation management system which manages these pieces of information, and collects information concerning the handover quality of the optimization target cell.

The optimum-parameter deriving unit 190 sets a plurality of handover parameters to the optimization target cell, and derives an optimum value of the handover parameter from respective estimation results of handover properties of the handover parameters.

In the present exemplary embodiment, the handover-parameter-candidate prescription unit 180 and the optimum-parameter deriving unit 190 may be, for example, by a CPU or the like which works according to a program.

Figure 9:
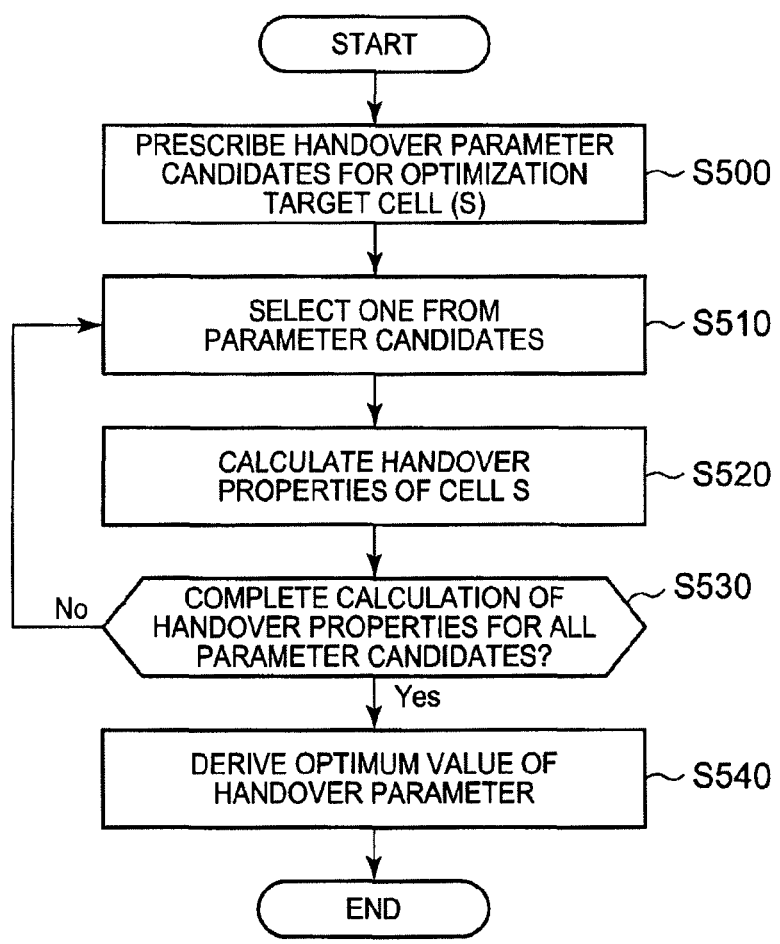
FIG. 9 is a flowchart showing an example of an operation of the handover properties estimation system of the second exemplary embodiment.

The operation of the present exemplary embodiment is described below. FIG. 9 is a flowchart showing an example of the operation of the handover parameter improvement or optimization system of the present exemplary embodiment. FIG. 9 exemplifies an operation to optimize a handover parameter of an optimization target cell (here, referred to as cell S) located in an evaluation area, of which cell the handover parameter is improved or optimized.

In the example shown in FIG. 9, the handover-parameter-candidate prescription unit 180 initially prescribes a type of a handover parameter to be optimized and candidates for its value (S500). The handover parameter may be one type, or there may be a plurality of types.

Subsequently, the optimum-parameter deriving unit 190 selects one from the candidates of the handover parameter prescribed in operation S500, and assumes it as a parameter of the optimization target cell (S510). Then, based on the parameter selected in operation S510, handover properties are calculated by the method shown in the first exemplary embodiment (S520). A specific calculation procedure of the handover properties, that is, an estimation procedure of the handover properties is the same as the procedure in the first exemplary embodiment. Note that, in the present exemplary embodiment, similarly to the first exemplary embodiment, the controller 160 may control each process so that a calculation result of each parameter may be output to the optimum-parameter deriving unit 190. Instead of the controller 160 in the first exemplary embodiment, the optimum-parameter deriving unit 190 may control each process.

Subsequently, the optimum-parameter deriving unit 190 determines whether or not the calculation process of handover properties in operation S520 is performed for all the candidates of the handover parameter prescribed in operation S500 (S530). When the calculation process is not performed for all the candidates, the operation of the handover parameter optimization system returns to operation S510, and a next parameter candidate is selected.

When the calculation process of a handover properties is performed for all the candidates of the handover parameter (Yes in S530), the optimum-parameter deriving unit 190 assumes a parameter which achieves the best handover properties as a result of the estimation, as an optimum value of the handover parameter (S540).

Note that the estimation of a handover properties in operation S520 is performed only for the optimization target cell in the present exemplary embodiment. However, the estimation of a handover properties may be performed for cells other than the optimization target cell. For example, the optimum-parameter deriving unit 190 performs the estimation of a handover properties for neighboring cells of the optimization target cell, and may assume, as the optimum value, a handover parameter which achieves the best handover properties for all evaluated cells.

The handover parameter optimization system of the present exemplary embodiment estimates handover properties for prescribed handover parameter candidates by the method in the first exemplary embodiment, and derives a parameter which exhibits the best properties, as an optimum value of the handover parameter. Thus, it is possible to optimize a handover parameter for improving the handover quality at high speed.

Figure 10:
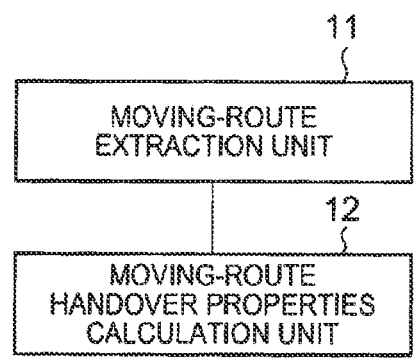
FIG. 10 is a block diagram showing a handover properties estimation system.

FIG. 10 is a block diagram showing a handover properties estimation system of an exemplary embodiment. As shown in FIG. 10, the handover properties estimation system includes a moving-route extraction unit 11 and a moving-route handover properties calculation unit 12.

With respect to a handover area to be estimated, defined as an area in which a handover process occurs between cells in a target mobile communication system, the moving-route extraction unit 11 extracts moving routes which pass through the handover area or its neighboring area by use of map information of the handover area or its neighboring area. The moving-route extraction unit 11 corresponds to the moving-route-pattern extraction unit 130 in the aforementioned exemplary embodiment.

The moving-route handover properties calculation unit 12 calculates handover properties on each of the moving routes extracted by the moving-route extraction unit 11, by use of radio-wave environment information of the each of the moving routes or its neighboring area. The moving-route handover properties calculation unit 12 corresponds to the moving-route handover properties calculating unit 140 in the aforementioned exemplary embodiment.

According to such a configuration, for example, handover properties in an evaluation-target area is estimated based on a handover properties on each moving route calculated by the moving-route handover properties calculation unit 12. Consequently, handover properties over the whole evaluation-target area is estimated at high speed and with high accuracy.

Note that the moving-route handover properties calculation unit 12 may calculate, for every predetermined time step, a received-signal quality obtained when a mobile terminal of the mobile communication system goes along the moving route, and calculate the handover properties on the moving route by use of the received-signal quality thus calculated.

Further, the moving-route handover properties calculation unit 12 may calculate a received-signal quality to which an effect of a radio-wave fluctuation in the mobile terminal is added.

Further, the moving-route handover properties calculation unit 12 may analytically calculate, for every time step, a probability that a handover process starts based on the received-signal quality thus calculated, and when a handover process is started, the moving-route handover properties calculation unit 12 may analytically calculate a probability that the handover process is finished normally, thereby calculating the handover properties on the moving route by use of the handover-process starting probability thus calculated and the handover-process normal-end probability thus calculated.

Further, the moving-route handover properties calculation unit 12 may calculate, for every time step, a received-signal quality obtained when the mobile terminal goes along the moving route and to which an effect of a radio-wave fluctuation is given by a random number, and perform a process of simulating a system operation based on the received-signal quality thus calculated, several times by chancing the random number, so as to calculate the handover properties on the moving route.

Further, the handover area may be a set of spots that will be handover triggers between cells of the mobile communication system. In such a case, for example, with respect to a handover area specified as the set of spots that will be the handover triggers between cells, the moving-route extraction unit 11 may extract moving routes which pass through the handover area or its neighboring area by use of map information of the handover area or its neighboring area.

Further, the moving route may be constituted by a plurality of road segments. In such a case, for example, the moving-route extraction unit 11 can extract a route that is constituted by a plurality of road segments as the moving route by use of road information of a handover area or its neighboring area.

Further, the moving route may include a line segment which connects points prescribed to floors in a building, or a line segment which connects one of the points prescribed to the floors in the building with an outdoor road segment. In such a case, for example, the moving-route extraction unit 11 extracts, as a moving route, not only a route constituted by a plurality of road segments, but also a route constituted by a line segment which connects points prescribed to floors in a building, or a line segment which connects one of the points prescribed to the floors in the building with an outdoor road segment, by use of map information including road information of a handover area or its neighboring area and building information.

Figure 11:
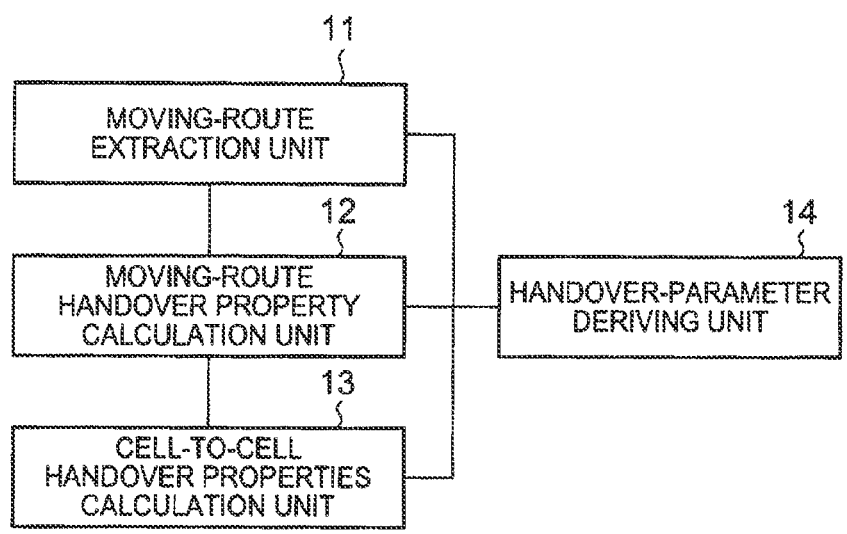
FIG. 11 is an explanatory view showing another handover properties estimation system.

FIG. 11 shows a block diagram showing another exemplary configuration of a handover properties estimation system. The handover properties estimation system shown in FIG. 11 further includes a cell-to-cell handover properties calculation unit 13.

The cell-to-cell handover properties calculation unit 13 combines handover properties of all moving routes extracted for a handover area defined as an area in which a handover process occurs between cells of a target mobile communication system to be estimated, thereby calculating handover properties between the cells. The handover properties are calculated by the moving-route handover properties calculation unit 12. The cell-to-cell handover properties calculation unit 13 may combine respective handover properties calculated for respective moving routes extracted for a handover area defined as an area in which a handover process occurs between a certain cell to another cell of a target mobile communication system to be estimated, thereby calculating handover properties between the cells. The cell-to-cell handover properties calculation unit 13 corresponds to the whole-area handover properties calculating unit 150 in the aforementioned exemplary embodiment.

Further, as shown in FIG. 11, the handover properties estimation system may include a handover-parameter deriving unit 14. The handover-parameter deriving unit 14 calculates handover properties between cells obtained when a parameter is applied, for each of a plurality of candidates for a setting value of a handover parameter, and derives a handover parameter which achieves the best handover properties. The handover-parameter deriving unit 14 corresponds to the optimum-parameter deriving unit 190 in the aforementioned exemplary embodiment. In the case where the handover-parameter deriving unit 14 is provided, the handover properties estimation system can be regarded as a handover parameter improvement or optimization system.

These embodiments can be applied to use applications such as parameter adjustment/optimization to improve a handover quality in a mobile radio system such as a mobile phone.

Although exemplary embodiments have been described herein, it will be appreciated by those of skill in the art that changes may be made to these exemplary embodiments without departing from the principles and spirit of the inventive concept, the scope of which is defined in the appended claims and their equivalents.

What is claimed is:

1. A handover properties estimation system for estimating handover properties in a mobile communication system, the system comprising:
    a moving-route extraction unit which extracts moving routes that pass through a handover area or an area neighboring the handover area, wherein the handover area is defined as an area in which a handover process occurs between cells in the mobile communication system, and wherein the moving routes are extracted from map information of the handover area or the neighboring area; and
    a moving-route handover properties calculation unit which calculates handover properties for moving routes extracted by the moving-route extraction unit, by use of radio-wave environment information of the moving routes,
    wherein the moving-route handover properties calculation unit calculates the handover properties on the moving routes based on a received-signal quality obtained when a mobile terminal of the mobile communication system travels along the moving routes, and
    wherein the moving-route handover properties calculation unit calculates the received-signal quality and adds an effect of a radio-wave fluctuation in the mobile terminal to the calculated received-signal quality.

2. The handover properties estimation system according to claim 1 further comprising:
    a cell-to-cell handover properties calculation unit which calculates handover properties between cells by combining two or more handover properties calculated by the moving-route handover properties calculation unit.

3. The handover properties estimation system according to claim 1, wherein:
    the moving-route handover properties calculation unit calculates, a probability that a handover process starts, based on the received-signal quality thus calculated, and when the handover process starts, the moving-route handover properties calculation unit calculates a probability that the handover process is finished normally, thereby calculating the handover properties on the moving route by use of the handover-process starting probability thus calculated and the handover-process normal-end probability thus calculated.

4. The handover properties estimation system according to claim 1, wherein the moving-route handover properties calculation unit calculates a received-signal quality and adds a random number to the calculated received-signal quality, performs a process of simulating a system operation based on the received-signal quality to which the random number has been added, and repeats the process of adding a new random number to the calculated received-signal quality and simulating the system operation based on the received signal-quality to which the new random number is added.

5. The handover properties estimation system according to claim 1, wherein the handover area comprises a set of locations that will be trigger a handover between cells in the mobile communication system.

6. The handover properties estimation system according to claim 1, wherein the moving route comprises a plurality of road segments.

7. The handover properties estimation system according to claim 6, wherein the moving route comprises one of a line segment which connects a first location within a building to a second location in a building or a line segment which connects a location within a building to an outdoor road segment.

8. A handover properties estimation method for estimating handover properties in a mobile communication system, the method comprising:
    extracting moving routes which pass through a handover area or an area neighboring the handover area, wherein the handover area is defined as an area in which a handover process occurs between cells in the mobile communication system, and wherein the moving routes are extracted from map information of the handover area or the neighboring area; and
    calculating handover properties of the moving routes thus extracted, by using radio-wave environment information for the moving routes,
    wherein the handover properties on the moving routes are calculated based on a received-signal quality obtained when a mobile terminal of the mobile communication system travels along the moving routes; and
    wherein an effect of a radio-wave fluctuation in the mobile terminal is added to the calculated received-signal quality.

9. A non-transitory computer readable information recording medium storing a program which, when executed by a processor, performs a method comprising:
    extracting moving routes which pass through a handover area or an area neighboring the handover area, wherein the handover area is defined as an area in which a handover process occurs between cells in the mobile communication system, and wherein the moving routes are extracted from map information of the handover area or the neighboring area; and
    calculating handover properties of the moving routes thus extracted, by using radio-wave environment information for the moving routes,
    wherein the handover properties on the moving routes are calculated based on a received-signal quality obtained when a mobile terminal of the mobile communication system travels along the moving routes; and
    wherein an effect of a radio-wave fluctuation in the mobile terminal is added to the calculated received-signal quality.

10. The handover properties estimation system according to claim 1, further comprising:
    a cell-to-cell handover properties calculating unit which calculates handover properties between cells by combining the handover properties on the moving routes calculated by the moving-route handover properties calculation unit; and
    a handover-parameter deriving unit which derives a handover parameter which achieves a best handover property based on the calculated handover properties between the cells.

11. The handover properties estimation method according to claim 8, further comprising:

calculating handover properties between the cells by combining a plurality of the calculated handover properties; and deriving a handover parameter which achieves a best handover property, based on the calculated handover properties between the cells.

12. The non-transitory computer readable information recording medium according to claim 9, wherein the method further comprises:

calculating handover properties between the cells by combining a plurality of the calculated handover properties; and deriving a handover parameter which achieves a best handover property, based on the calculated handover properties between the cells.

* * * * *